(12) United States Patent
Surampudi

(10) Patent No.: US 11,646,597 B2
(45) Date of Patent: May 9, 2023

(54) FAST CHARGING FOR LITHIUM-ION BATTERIES USING PULSE WIDTH MODULATED CHARGING AND COOLING

(71) Applicant: Southwest Research Institute, San Antonio, TX (US)

(72) Inventor: Bapiraju Surampudi, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 252 days.

(21) Appl. No.: 17/014,753

(22) Filed: Sep. 8, 2020

(65) Prior Publication Data

US 2022/0077712 A1    Mar. 10, 2022

(51) Int. Cl.
*H02J 7/00* (2006.01)
*H01M 10/0525* (2010.01)
*H01M 10/48* (2006.01)
*H01M 10/613* (2014.01)
*H01M 10/633* (2014.01)
*H01M 10/44* (2006.01)

(52) U.S. Cl.
CPC ... *H02J 7/007194* (2020.01); *H01M 10/0525* (2013.01); *H01M 10/443* (2013.01); *H01M 10/486* (2013.01); *H01M 10/613* (2015.04); *H01M 10/633* (2015.04); *H02J 7/0047* (2013.01)

(58) Field of Classification Search
CPC .............. H02J 7/007194; H02J 7/0047; H02J 7/00711; H01M 10/0525; H01M 10/443; H01M 10/486; H01M 10/613; H01M 10/633; Y02E 60/10; Y02T 10/70; Y02T 90/40
See application file for complete search history.

(56) References Cited

U.S. PATENT DOCUMENTS

| | | | |
|---|---|---|---|
| 7,227,336 B1 * | 6/2007 | van Schalkwijk | H02J 7/00711 320/141 |
| 9,059,590 B2 | 6/2015 | Cassidy | |
| 10,396,570 B2 | 8/2019 | Loncarevic | |
| 2006/0036883 A1 | 2/2006 | Hashizumi et al. | |
| 2011/0031932 A1 * | 2/2011 | Platonov | H02J 7/00711 320/152 |

(Continued)

FOREIGN PATENT DOCUMENTS

| | | | |
|---|---|---|---|
| CN | 206271841 U | * | 6/2017 |
| CN | 107230812 A | * | 10/2017 |

(Continued)

OTHER PUBLICATIONS

Written Opinion of the International Searching Authority PCT/US21/49482.

*Primary Examiner* — Stacy Whitmore
(74) *Attorney, Agent, or Firm* — Livingston Law Firm

(57) ABSTRACT

A method of charging a lithium-ion battery. It is assumed that the battery has a cooling system. A desired temperature profile for the battery during charging is determined. The charge current is pulse width modulated (PWM), as is the activation of the cooling system. During charging, various parameters of either or both of the PWM signals are adjusted such that the desired temperature profile is maintained.

14 Claims, 2 Drawing Sheets

(56) References Cited

U.S. PATENT DOCUMENTS

| | | | |
|---|---|---|---|
| 2013/0076312 A1* | 3/2013 | Huang | H02J 7/007192 |
| | | | 320/145 |
| 2014/0333313 A1* | 11/2014 | Surampudi | H01M 10/48 |
| | | | 324/426 |
| 2015/0377976 A1* | 12/2015 | Maluf | H02J 7/0048 |
| | | | 702/63 |
| 2017/0085098 A1* | 3/2017 | Sporck | H02J 7/00711 |
| 2018/0041063 A1* | 2/2018 | Isomura | H01M 4/52 |
| 2018/0339597 A1* | 11/2018 | Kruszelnicki | B60L 53/305 |
| 2018/0339601 A1* | 11/2018 | Kruszelnicki | B60L 53/16 |
| 2018/0339605 A1* | 11/2018 | Ochocinski | B60L 58/12 |
| 2019/0235026 A1* | 8/2019 | Ye | G01R 31/382 |
| 2020/0227801 A1 | 7/2020 | Kumar | |
| 2021/0223195 A1* | 7/2021 | Surampudi | G01K 13/00 |
| 2021/0344064 A1* | 11/2021 | Owen | H01M 10/482 |
| 2022/0045378 A1* | 2/2022 | Yang | H01M 10/6563 |
| 2022/0218999 A1* | 7/2022 | Wisnoskey | A61N 1/36542 |
| 2022/0219567 A1* | 7/2022 | Mankowski | B60L 50/60 |
| 2022/0224126 A1* | 7/2022 | Chen | H01M 10/441 |

FOREIGN PATENT DOCUMENTS

| | | | | |
|---|---|---|---|---|
| CN | 108470957 A | * | 8/2018 | H01M 10/613 |
| CN | 108539329 A | * | 9/2018 | |
| CN | 106183789 B | * | 11/2018 | B60H 1/00278 |
| CN | 108790675 A | * | 11/2018 | B60H 1/004 |
| WO | WO-2017128724 A1 | * | 8/2017 | H01M 10/44 |

* cited by examiner

FAST CHARGING FOR LITHIUM-ION BATTERIES USING PULSE WIDTH MODULATED CHARGING AND COOLING

TECHNICAL FIELD OF THE INVENTION

This invention relates to lithium-ion batteries, and more particularly to methods of charging such batteries.

BACKGROUND OF THE INVENTION

A lithium-ion battery is a type of rechargeable battery. Lithium-ion batteries are used for diverse applications such as portable electronics and electric vehicles and are growing in popularity for many additional applications.

In these batteries, lithium ions move from a negative electrode through an electrolyte to a positive electrode during discharge, and back when charging. Lithium-ion batteries use an intercalated lithium compound as the material at the positive electrode and typically graphite at the negative electrode.

Research is ongoing for lithium-ion batteries in areas such as battery life extension, energy density, safety, cost reduction, and charging speed. One field of research is investigation of how to charge the batteries quickly without compromising safety or battery usefulness and longevity.

Charging lithium-ion batteries is complicated by temperature limits. Charging at low temperatures can lead to unwanted lithium-plating. At higher temperatures, charging efficiency (fast charging) is improved, such as within a temperature range of 5 to 45° C. (41 to 113° F.). However, overly high temperatures during charging may lead to battery degradation and safety issues. For safety reasons, many devices equipped with lithium-ion batteries do not allow charging outside of a 0-45° C. range.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to methods for fast charging of lithium-ion batteries. An optimal charging method described herein combines pulse width modulated (PWM) charging with pulse width modulated (PWM) cooling during charging. Pulsing of the charge current results in reduced battery temperature and increased charge acceptance. Pulsing the cooling provides a thermal management strategy during charging that maximizes charge acceptance.

Figure 1:
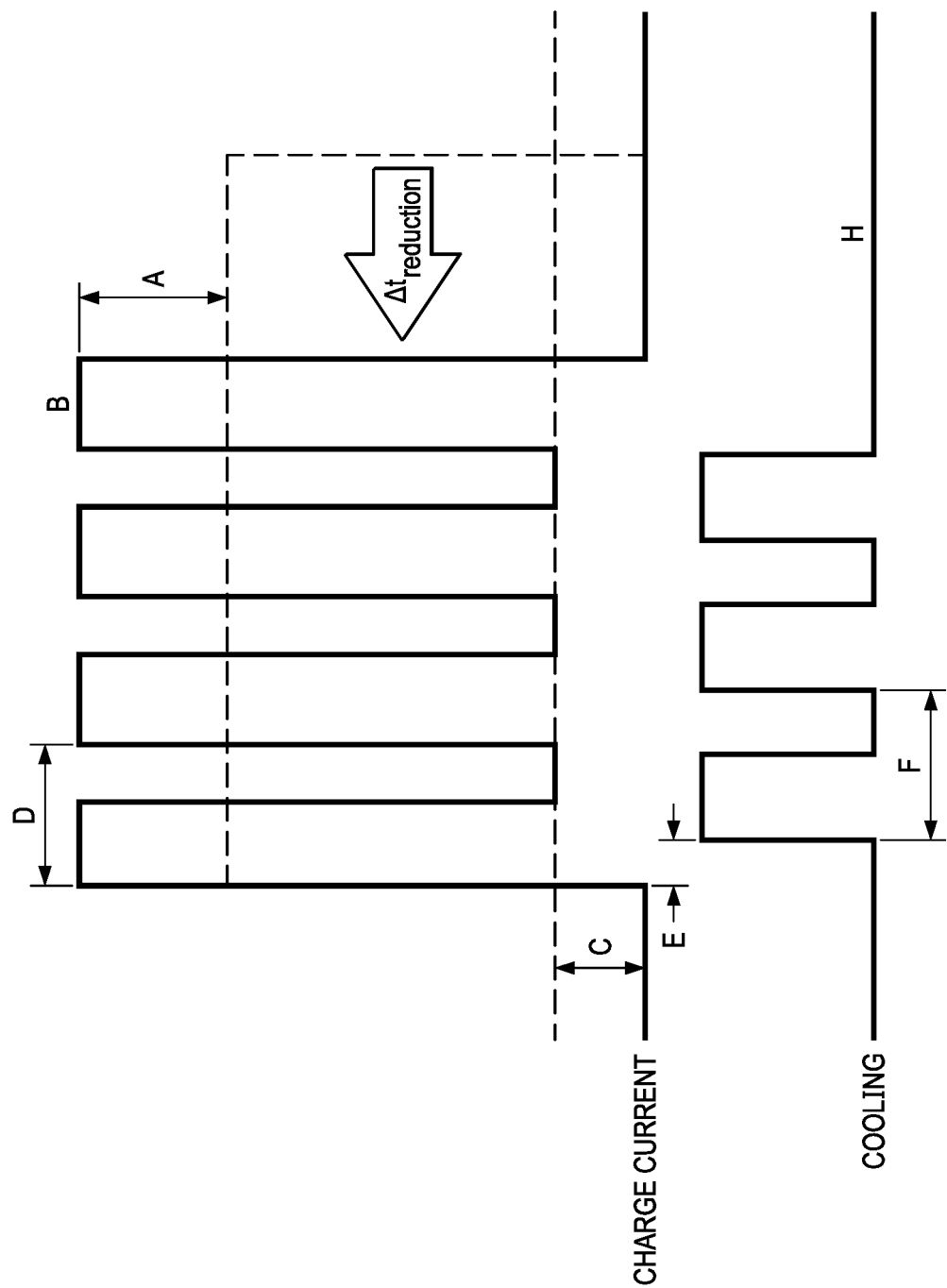
FIG. 1 illustrates a method of charging a lithium-ion battery, using pulse width modulated (PWM) charge current and a PWM control signal to the battery's cooling system.

FIG. 1 illustrates a method of charging a lithium-ion battery using pulse-width modulated charging and pulse-width modulated cooling. The cooling is controlled with a cooling control signal, and for purposes of this description any lag between the cooling control signal and actual battery cooling is assumed to be accommodated. As indicated, both charge current and cooling are pulsed, resulting in a known phase relationship between the charge current and battery cooling.

The charging method is characterized by a number of calibration factors. In FIG. 1, these factors are depicted as A—H and are as follows:

A—Average or mean charge current
B—Temperature of charging
C—Minimum charge current
D—Duty cycle of charge current (0-100%)
E—Phase between current and cooling duty cycles
F—Duty cycle of cooling or heat dissipation
G—Battery temperature profile for maximum charge acceptance (not shown)
H—Maximum cooling calories As shown, the charge current is pulsed with a duty cycle represented by calibration factor D. An example of a range of suitable charging periods is 15-60 seconds. Pulse charging is defined as the application of charge current pulses into the battery at a controlled frequency and duty cycle. Pulsing the charge current allows for reduction of temperature as well as increased charge acceptance.

As stated in the Background, temperature during charging is an important consideration. At higher temperatures during charging, charge efficiency is improved. Charging at lower temperatures has an adverse effect on battery aging and can result in undesired lithium plating.

For cooling, various existing thermal management techniques for battery packs may be categorized based on the working fluid (an air-cooled versus a liquid-cooled system) or functionality (an active cooling system with a heating or cooling source versus a passive system). For purposes of the method described herein, it is expected that the optimal cooling with be liquid cooling. However, the method is also applicable to batteries having forced air cooling.

The cooling system is "active" in the sense that a PWM cooling control signal results in PWM cooling. In the case of liquid cooling, the PWM cooling control signal is to a coolant pump.

In FIG. 1, the maximum cooling calories are represented by factor H. The heat dissipation (cooling) has a duty cycle, F, to which battery temperature responds. As indicated, battery cooling is activated with a PWM control signal during charging to result in PWM cooling (heat dissipation).

As stated above, a calibration factor, G, is a battery temperature profile for maximum charge acceptance. A desired temperature profile may have different temperatures for different states of charge.

The PWM charge current and the PWM cooling control signal are adjusted during charging so that the temperature of the battery maintains this profile of desired battery temperatures. Various temperature feedback values from the battery may be used for this purpose. Any one or more of the calibration factors A—F listed above may be adjusted to maintain the desired battery temperature profile.

Figure 2:
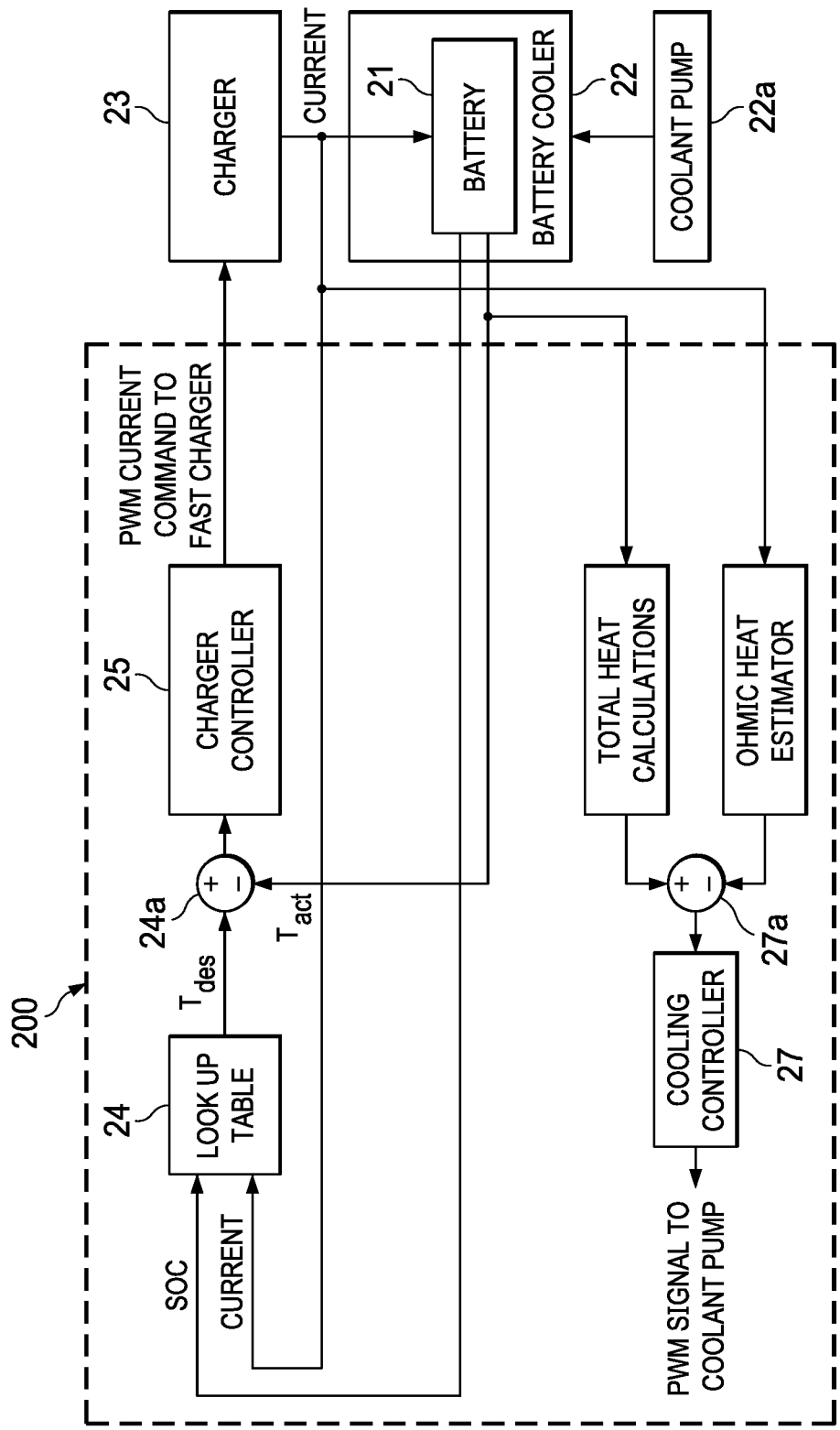
FIG. 2 illustrates a charge control system for implementing the method of FIG. 1.

FIG. 2 illustrates one embodiment of a control system 200 for implementing the PWM charge current and PWM cooling method of FIG. 1. A battery 21 is assumed to have a cooling system 22. It is assumed that battery 21 is equipped with appropriate measurement devices to provide its state of charge and its temperature for use by control system 200 as explained below.

A charger 23 generates the charge current. Charger 23 is a "fast charger" in the sense that it makes use of control system 200 to rapidly charge battery 21 without damaging any of the battery cells.

The battery cooling system 22 is schematically represented as battery cooler 22. As stated above, various cooling techniques may be used. Air-cooling circulates ambient or actively cooled air through the battery pack, and the heat is rejected to the surroundings. Liquid cooling typically involves a combination of coolant liquid and water as the working fluid. Liquid flow channels within the battery (between cells) provide heat exchange.

In the embodiment of FIG. 2, battery 21 is liquid cooled, with coolant being delivered from a coolant pump 22a. The delivery of liquid coolant is pulsed to result in PWM cooling, such as the PWM cooling of FIG. 1.

Control system 200 comprises a look-up table 24, which receives the battery's state of charge and charge current. Look-up table 24 has memory that maps these input values (state of charge and charge current) to an output of a desired battery temperature.

Battery 21 delivers its actual temperature as feedback to a temperature error calculator 24a, which also receives the desired temperature from look-up table 24. Error calculator 24a calculates a "desired battery temperature error", which is delivered to charger controller 25.

Charger controller 25 implements a process that determines a pulsed-width modulated (PWM) charge current. This PWM charge current has attributes optimized for battery 21 at a desired temperature. The attributes determined by charge controller 25 may include duty cycle, magnitude of current on the low side of the duty cycle, magnitude of current on the high side of the duty cycle, and phase relative to the PWM coolant signal.

An example of a suitable charger controller 25 is a single-input multiple-output controller. In the example of this description, charger controller 25 receives temperature error values that are based on both the desired temperature and feedback battery temperature. However, in other embodiments, the desired temperature values may be provided directly. Battery internal temperature can be inferred from real time impulse response behavior of the battery.

Cooling system controller 27 receives a heat value from battery 21. In the example of this description, cooling system controller 27 receives an error value that is based on multiple heat inputs. However, in other embodiments, only one of the heat inputs could be provided.

In the embodiment of this description, the heat value is derived from two heat inputs. A first heat input is represented as "total heat calculations" and is based on the actual battery temperature. A second heat input is an estimation of ohmic heat and is based on the charge current. These two heat inputs are used by a heat error calculator 27a to determine a battery heat error value.

This battery heat error value is delivered to coolant controller 27. Coolant controller 27 then generates a PWM cooling control signal, with specified duty cycle and magnitude, etc. In the example of this description, where coolant is delivered by a pump, these attributes may be pump duty cycle, magnitude of pump speed on the high side of the duty cycle, magnitude of the pump speed on the low side of the duty cycle, and phase relative to the PWM charge current.

An example of a suitable cooling system controller 27 is a single-input multiple-output controller.

It is assumed that both charge controller 25 and cooling controller 27 have appropriate processing hardware and software for performing the tasks described herein.

Although not shown in FIG. 2, charger controller 25 may also deliver feed-forward phasing data to cooling controller 27. Or, cooling controller 27 may deliver feedback phasing data to charger controller 25. As an example, if coolant pump 22a is operating at maximum speed, feedback data may inform controller 25 to back off on the amount of charge current.

In operation, charger controller 25 implements a process that determines when a target (desired) battery temperature will be reached. It then drops the charge current down to a C-rate where exothermic reactions are predominant. At the same time or with a pre-determined phase difference, cooling system controller 27 pulses the cooling flow to decrease battery temperature to prevent overheating.

The result is a C-rate that is higher than that of conventional charge methods and shorter charge times. Charging is more efficient due to higher allowable temperatures, but the charge temperature remains within a safe range. The method minimizes charge time by not dropping the charge current to zero amps, but rather by taking advantage of the endothermic characteristics of the battery in sequence with cooling system control to reduce temperature at optimal rates.

What is claimed is:

1. A method of charging a lithium-ion battery, the battery having a cooling system, comprising:
    determining a battery temperature profile, representing a predetermined set of different temperature values that vary over time as the battery is being charged;
    delivering a pulse-width modulated charge current to the battery;
    delivering a pulse-width modulated cooling control signal to the cooling system;
    adjusting one or more of the following during charging such that the desired temperature profile is maintained: phase between charge current and cooling control signal or duty cycle of cooling control signal.

2. The method of claim 1, wherein the cooling system is a fluid cooling system with a pump, and the adjusting step is performed by adjusting pump speed.

3. A control system for charging a lithium-ion battery, the battery having a cooling system, and comprising:
    a look-up process that receives a current state of charge of the battery during charging and maps the current state of change to a desired temperature at that state of charge;
    a charger controller operable to generate a pulse width modulated (PWM) charge current command to achieve the desired temperature, and to deliver the PWM charge current command to the charger; and
    a cooling system controller operable to receive battery heat values, to generate a pulse width modulated (PWM) cooling system command to match a current battery heat value to the desired temperature, and to deliver the PWM cooling system command to the cooling system.

4. The control system of claim 3 further comprising a temperature error calculator which determines temperature error values between the desired temperature values and actual temperature values from the battery, and wherein the charge controller receives the error values.

5. The control system of claim 3 wherein the battery heat values are based on actual battery temperatures.

6. The control system of claim 3 wherein the battery heat values are ohmic heat values.

7. The control system of claim 3 wherein the battery heat values are error values between values based on actual battery temperatures and ohmic heat values.

8. The system of claim 3, wherein the cooling system is a fluid cooling system with a pump, and the PWM cooling system command is delivered to the pump.

9. A method of charging a lithium-ion battery, the battery having a cooling system and a battery management system that provides battery heat values, comprising:
  determining desired temperature values from a look-up process that maps a state of charge of the battery to a desired temperature at that state of charge;
  using a charger controller to receive the desired battery temperature, to generate a pulse width modulated (PWM) charge current command to achieve the desired battery temperature, and to deliver the PWM charge current command to the charger; and
  using a cooling system controller to receive the battery heat values, to generate a pulse width modulated (PWM) cooling system command to match a current battery value to the desired temperature, and to deliver the PWM cooling system command to the cooling system.

10. The method of claim 9 further comprising a temperature error calculator that calculates temperature error values representing differences between desired temperature values and actual battery temperature values, and wherein the charger controller receives the temperature error values.

11. The method of claim 9 wherein the battery heat values are based on actual battery temperatures.

12. The method of claim 9 wherein the battery heat values are ohmic heat values.

13. The method of claim 9 further comprising a heat error calculator that calculates heat error values representing differences between heat values based on the actual battery temperature and ohmic heat values, and wherein the cooling system controller receives the heat error values.

14. The method of claim 9, wherein the cooling system is a fluid cooling system with a pump, and the PWM cooling system command controls pump speed.

* * * * *